United States Patent
Kim et al.

(10) Patent No.: US 11,184,862 B2
(45) Date of Patent: Nov. 23, 2021

(54) METHOD AND DEVICE FOR TERMINAL TO SET TRANSMIT POWER FOR PLURALITY OF CCS DURING CARRIER AGGREGATION IN WIRELESS COMMUNICATION SYSTEM

(71) Applicant: LG Electronics Inc., Seoul (KR)

(72) Inventors: Heejin Kim, Seoul (KR); Seungmin Lee, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 102 days.

(21) Appl. No.: 16/638,432

(22) PCT Filed: Aug. 13, 2018

(86) PCT No.: PCT/KR2018/009281
§ 371 (c)(1),
(2) Date: Feb. 11, 2020

(87) PCT Pub. No.: WO2019/031950
PCT Pub. Date: Feb. 14, 2019

(65) Prior Publication Data
US 2020/0205089 A1    Jun. 25, 2020

Related U.S. Application Data

(60) Provisional application No. 62/565,128, filed on Sep. 29, 2017, provisional application No. 62/543,970, filed on Aug. 11, 2017.

(51) Int. Cl.
*H04W 52/34* (2009.01)
*H04L 5/00* (2006.01)
*H04W 52/36* (2009.01)

(52) U.S. Cl.
CPC .............. *H04W 52/34* (2013.01); *H04L 5/001* (2013.01); *H04W 52/365* (2013.01); *H04W 52/367* (2013.01)

(58) Field of Classification Search
CPC . H04W 52/34; H04W 52/365; H04W 52/367; H04W 52/281; H04W 52/146;
(Continued)

(56) References Cited

U.S. PATENT DOCUMENTS

2011/0287804 A1* 11/2011 Seo .................. H04L 5/0048
455/522
2013/0176953 A1   7/2013 Stern-Berkowitz et al.
(Continued)

FOREIGN PATENT DOCUMENTS

JP       5952315       7/2016
JP       2017507583    3/2017
(Continued)

OTHER PUBLICATIONS

PCT International Search Report and Written Opinion in International Application. No. PCT/KR2018/009281, dated Nov. 29, 2018, 8 pages.
(Continued)

*Primary Examiner* — Shaima Q Aminzay
(74) *Attorney, Agent, or Firm* — Fish & Richardson P.C.

(57) ABSTRACT

An embodiment of the present invention is a method for setting transmit power. The method for a terminal to set the transmit power for a plurality of component carriers (CCs) during carrier aggregation transmission in a wireless communication system includes: a step for acquiring a prose per-packet priority (PPPP) of a signal transmitted from an individual CC; a step for calculating the transmit power of the signal transmitted from the individual CC; and a step for setting a minimum guaranteed power for the individual CC if the sum of the transmit powers of the individual CCs exceeds a preset value, wherein the minimum guaranteed power indicates the minimum transmit power to be transmitted from the individual CCs, and the minimum guaran-
(Continued)

teed power is set for each PPPP. The UE is capable of communicating with at least one of another UE, a UE related to an autonomous driving vehicle, the BS or a network.

13 Claims, 12 Drawing Sheets

(58) Field of Classification Search
CPC .... H04W 52/383; H04W 52/346; H04L 5/001
USPC .......................................................... 455/522
See application file for complete search history.

(56) References Cited

U.S. PATENT DOCUMENTS

| | | |
|---|---|---|
| 2014/0376471 A1 | 12/2014 | Nishio et al. |
| 2015/0189601 A1 | 7/2015 | Shin et al. |
| 2016/0211952 A1 | 7/2016 | Meng et al. |
| 2017/0142664 A1 | 5/2017 | Seo et al. |

FOREIGN PATENT DOCUMENTS

| | | |
|---|---|---|
| KR | 20100113262 | 10/2010 |
| KR | 20150105352 | 9/2015 |
| KR | 1020150121005 | 10/2015 |
| WO | WO2016/159728 | 10/2016 |

OTHER PUBLICATIONS

KR Notice of Allowance in Korean Appln. No. 10-2020-7007013, dated Jan. 25, 2021, 3 pages (with English translation).
EP Extended European Search Report in European Appln. No. 18843737.0, dated Mar. 31, 2021, 23 pages.
LG Electronics, "List of agreements for 'LTE-based V2X support'," R1-1704141, 3GPP TSG RAN WG1 Meeting #88, Athens, Greece, dated Feb. 13-17, 2017, 20 pages.
Samsung, "Power allocation for simultaneous UL and SL TX in different carriers," R1-1612393, 3GPP TSG RAN WG1 Meeting #87, Reno, USA, dated Nov. 14-18, 2016, 3 pages.

* cited by examiner

FIG. 5
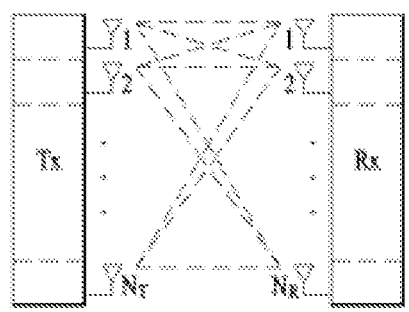
(a)
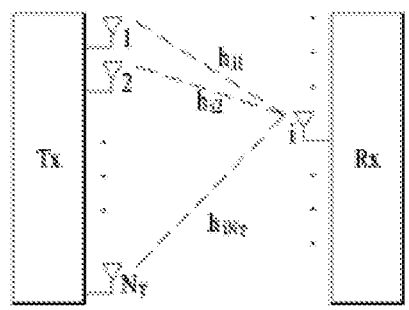
(b)

FIG. 9
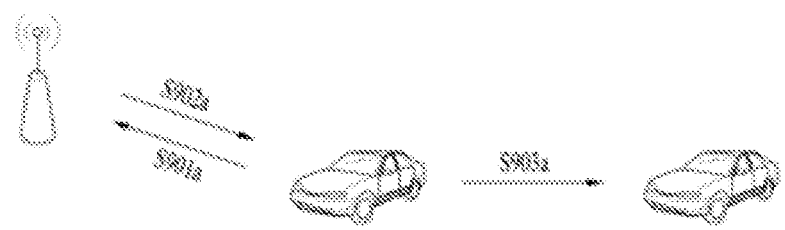
(a)
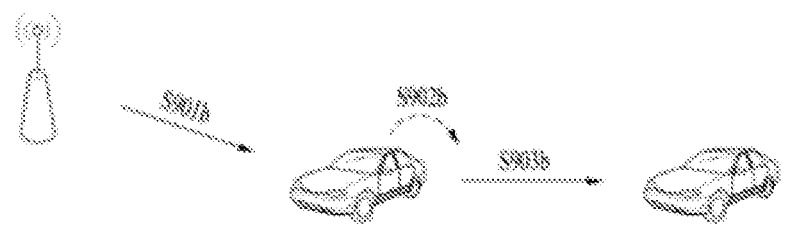
(b)

FIG. 12
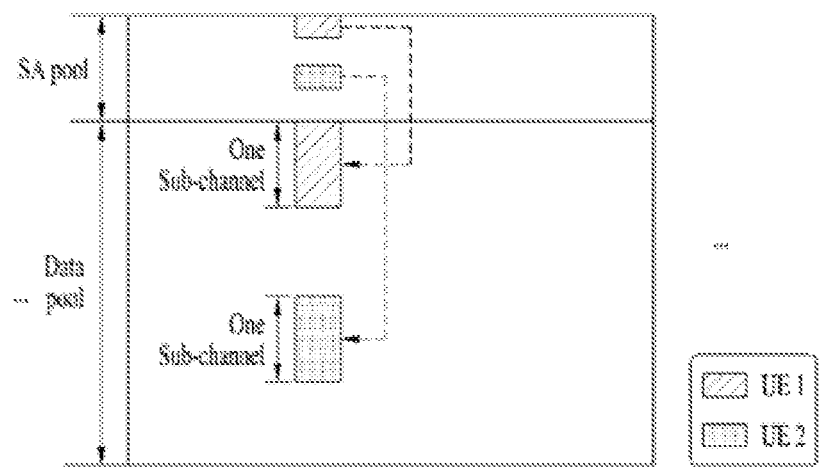
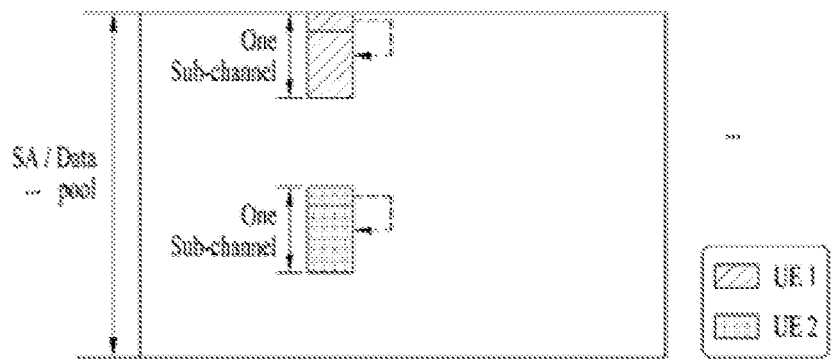

METHOD AND DEVICE FOR TERMINAL TO SET TRANSMIT POWER FOR PLURALITY OF CCS DURING CARRIER AGGREGATION IN WIRELESS COMMUNICATION SYSTEM

CROSS-REFERENCE TO RELATED APPLICATIONS

This application is a National Stage application under 35 U.S.C. § 371 of International Application No. PCT/KR2018/009281, filed on Aug. 13, 2018, which claims the benefit of U.S. Provisional Application No. 62/565,128, filed on Sep. 29, 2017, and U.S. Provisional Application No. 62/543,970, filed on Aug. 11, 2017. The disclosures of the prior applications are incorporated by reference in their entirety.

TECHNICAL FIELD

The following description relates to a wireless communication system, and more particularly, to a method and apparatus for setting a transmit power for a plurality of component carriers (CC) during carrier aggregation transmission in a V2X.

BACKGROUND ART

Wireless communication systems have been widely deployed to provide various types of communication services such as voice or data. In general, a wireless communication system is a multiple access system that supports communication of multiple users by sharing available system resources (a bandwidth, transmit power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present invention is to provide a method for setting a transmit power for a carrier when carrier aggregation is used in V2X.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for configuring transmit powers for a plurality of component carriers (CCs) of a terminal in a wireless communication system may include acquiring prose per-packet priorities (PPPPs) of signals transmitted on the individual CCs, calculating transmit powers for the signals transmitted on the individual CCs, and setting a minimum guaranteed power for the individual CCs when a sum of the transmit powers for the individual CCs exceeds a preset value, wherein the minimum guaranteed power may represent a lowest power among the transmit powers transmittable on the individual CCs, wherein the minimum guaranteed power may be set for each of the PPPPs.

In another aspect of the present disclosure, a method for configuring transmit powers for a plurality of component carriers (CCs) of a terminal in a wireless communication system may include acquiring prose per-packet priorities (PPPPs) of signals transmitted on the individual CCs, calculating transmit powers for the signals transmitted on the individual CCs, and setting a maximum allowed power for the individual CCs when a sum of the transmit powers of the individual CCs exceeds a preset value, wherein the maximum allowed power may represent a highest power among the transmit powers transmittable on the individual CC, wherein the maximum allowed power may be set for each of the PPPPs.

In another aspect of the present disclosure, a user equipment (UE) for configuring transmit powers for a plurality of component carriers (CCs) in a wireless communication system may include a transmitter and a receiver, and a processor, wherein the processor may be configured to acquire prose per-packet priorities (PPPPs) of signals transmitted on the individual CCs, calculate transmit powers for the signals transmitted on the individual CCs, and set a minimum guaranteed power for the individual CCs when a sum of the transmit powers for the individual CCs exceeds a preset value, wherein the minimum guaranteed power may represent a lowest power among the transmit powers transmittable on the individual CCs, wherein the minimum guaranteed power may be set for each of the PPPPs.

In another aspect of the present disclosure, a user equipment (UE) for configuring transmit powers for a plurality of component carriers (CCs) in a wireless communication system may include a transmitter and a receiver, and a processor, wherein the processor may be configured to acquire prose per-packet priorities (PPPPs) of signals transmitted on the individual CCs, calculate transmit powers for the signals transmitted on the individual CCs, and set a maximum allowed power for the individual CCs when a sum of the transmit powers of the individual CCs exceeds a preset value, wherein the maximum allowed power may represent a highest power among the transmit powers transmittable on the individual CC, wherein the maximum allowed power may be set for each of the PPPPs.

The minimum guaranteed power may have different values for the PPPPs.

The minimum guaranteed power of a signal with a high PPPP of the PPPPs may be greater than the minimum guaranteed power of a signal with a low PPPP of the PPPPs.

The minimum guaranteed power may be set differently for each of the individual CCs based on a state of a channel for transmission of each of the individual CCs.

The maximum allowed power may have different values for the PPPPs.

The maximum allowed power of a signal with a high PPPP of the PPPPs may be greater than the maximum allowed power of a signal with a low PPPP of the PPPPs.

The maximum allowed power may be set differently for each of the individual CCs based on a state of a channel for transmission of each of the individual CCs.

The preset value may be less than a maximum transmittable power of the terminal.

Advantageous Effects

According to the present disclosure, when a V2X terminal transmits a signal through carrier aggregation, sensing, resource selection, and signaling related thereto may be efficiently processed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas

FIG. 9 is a view referred to for describing transmission modes and scheduling schemes for vehicle-to-everything (V2X)

FIG. 12 is a view referred to for describing an SA and data transmission in V2X

BEST MODE

Figure 1:
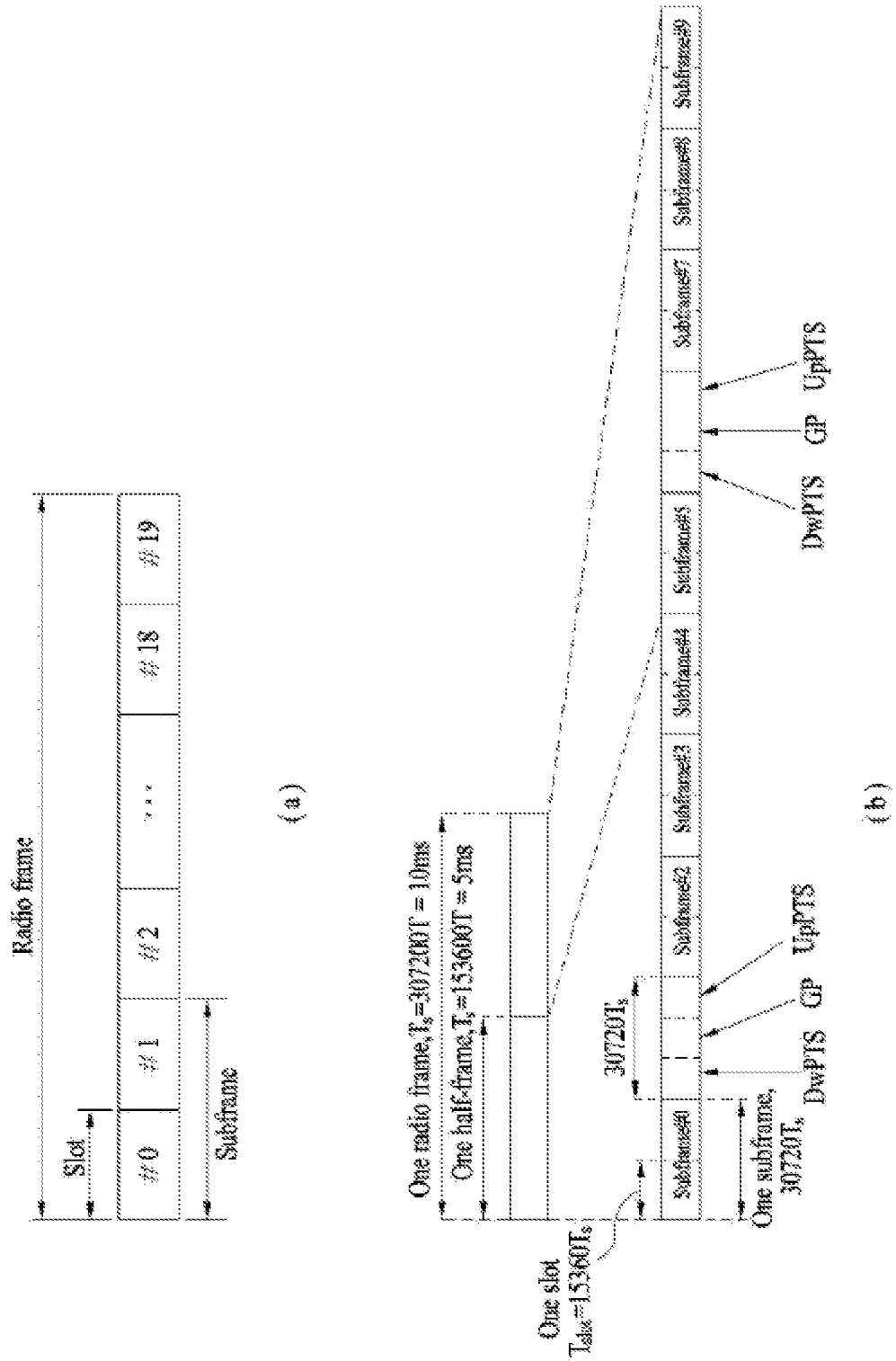
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc. In addition, in the following description, the term BS may also be used to refer to a device such as a scheduling execution node and a duster header. When the BS or the relay transmits a signal as transmitted by a UE, it may be regarded as a kind of UE.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
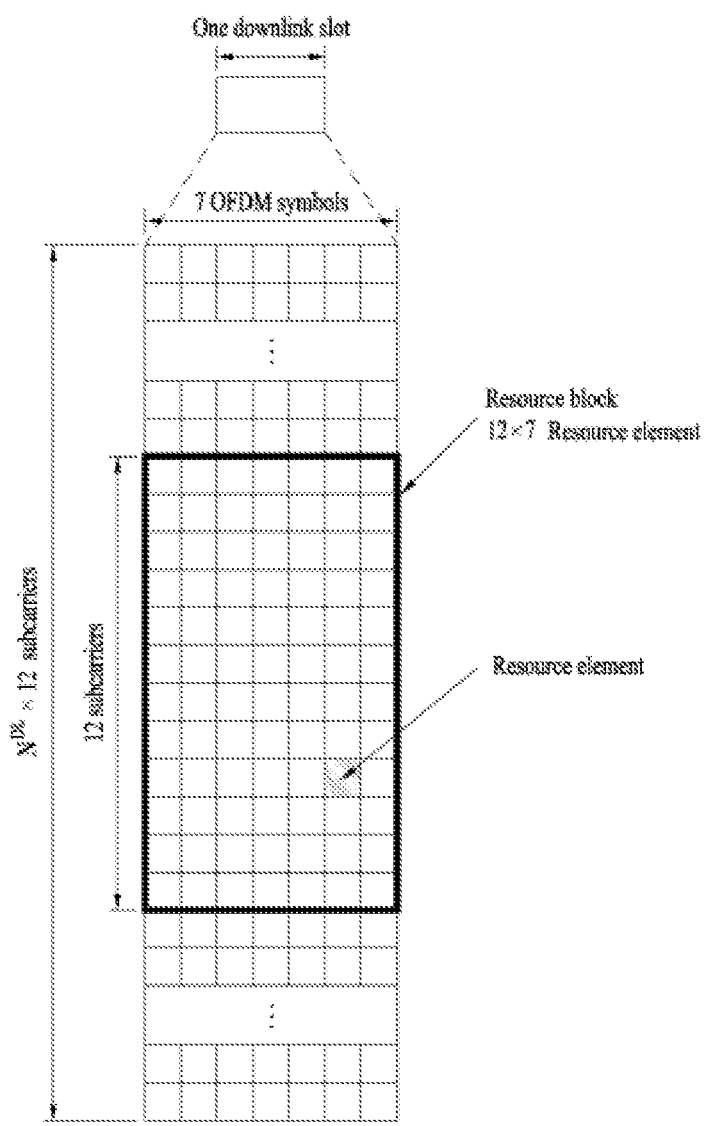
FIG. 2 is a view illustrating a resource grid during the duration of one downlink slot

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
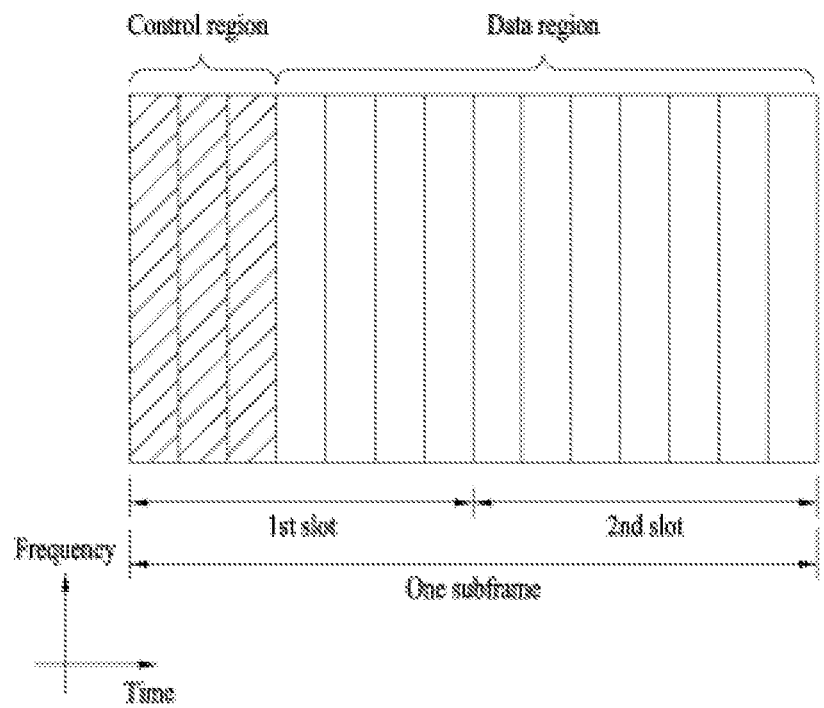
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmit power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmit power control commands for individual UEs of a UE group, transmit power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
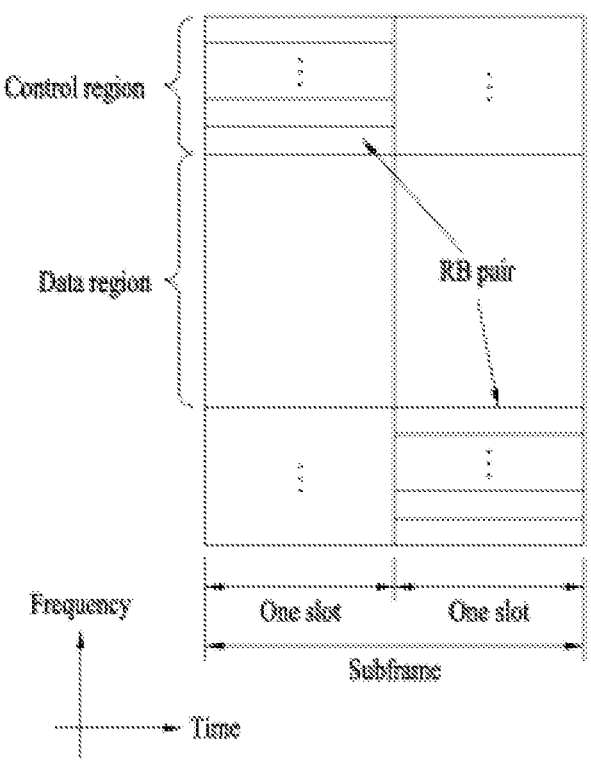
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_1,\ldots,\hat{s}_{N_T}]^T=[P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots y_{N_R}$ of the antennas can be expressed as follows.

$$y=[y_1, y_2, \ldots y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots n_{N_R}$ respectively added to the $N_R$ Rx antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
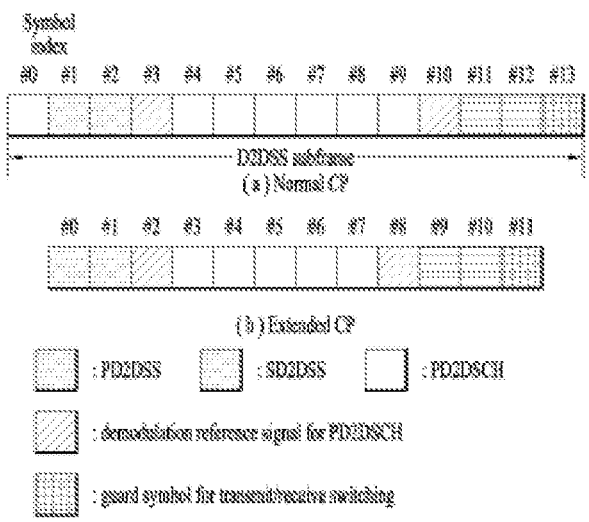
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
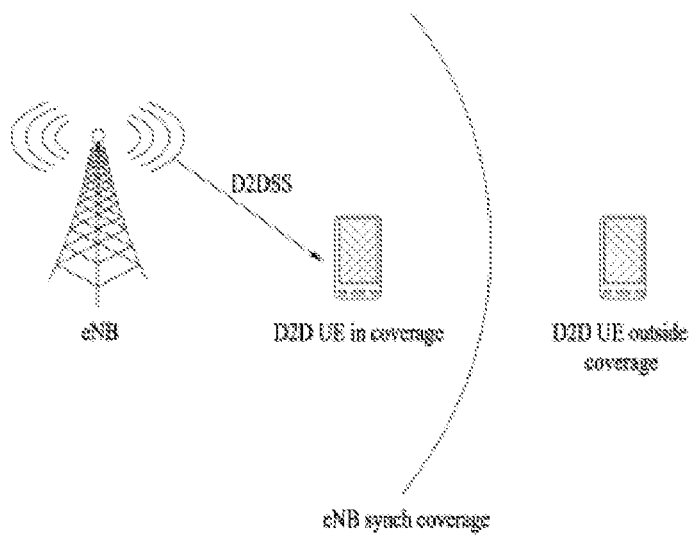
FIG. 7 is a view illustrating relay of a D2D signal

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
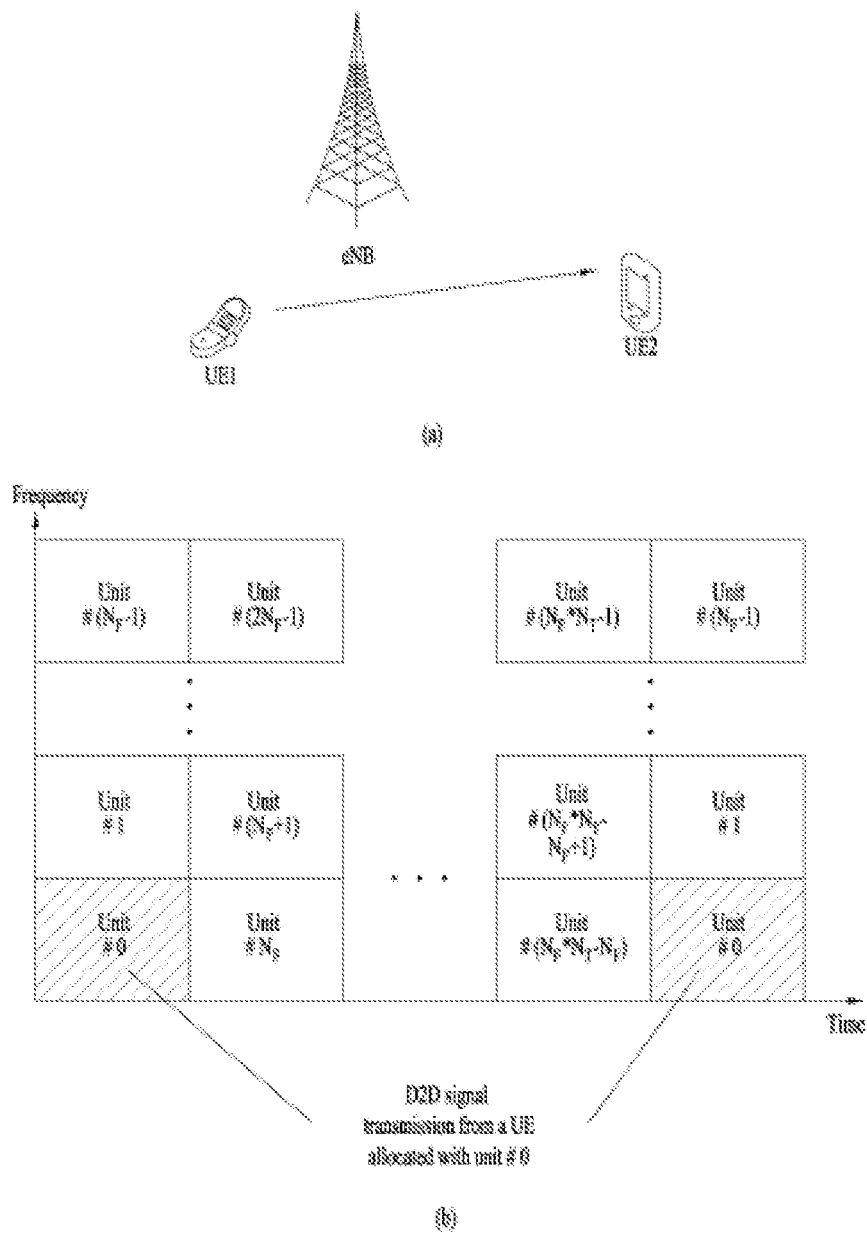
FIG. 8 is a view illustrating an exemplary D2D resource pool for D2D communication

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmit power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In sidelink transmission mode 2, a maximum of 8 transmission resource areas may be configured by the eNB. One or more Prose Per-Packet Priorities (PPPPs) may be connected to the maximum of 8 transmission resource areas, and the D2D UE selects a transmission resource area matching the PPPP value of a data packet to transmit the data packet. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
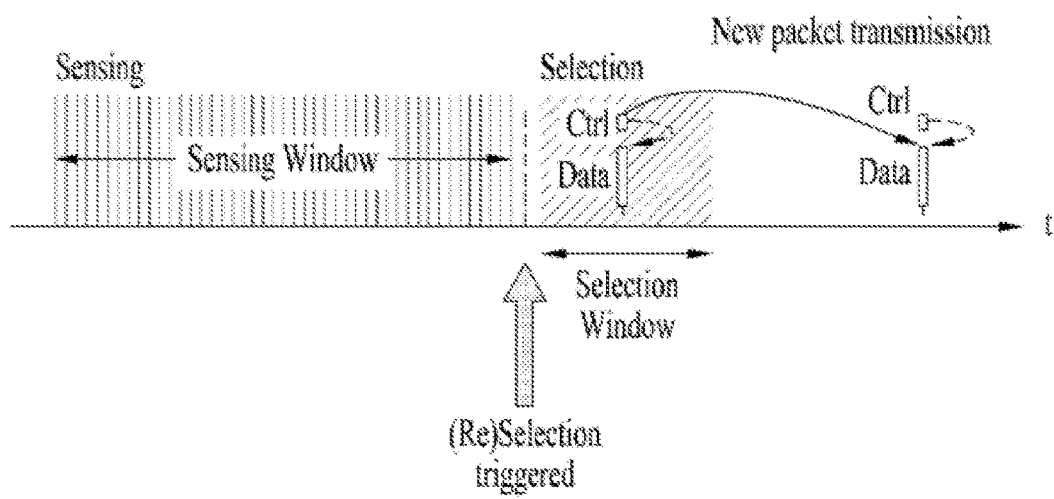
FIG. 10 is a view illustrating a method of selecting resources in V2X
Figure 11:
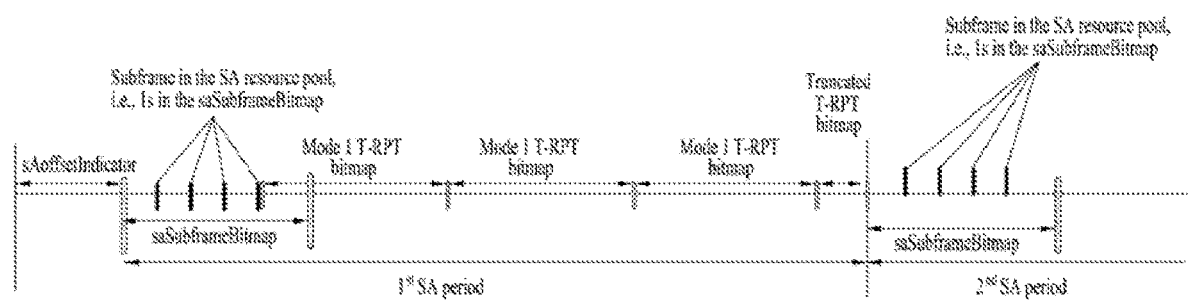
FIG. 11 is a view referred to for describing a scheduling assignment (SA) and data transmission in D2D

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901$a$), the eNB allocates the resources (S902$a$), and the vehicle transmits a signal in the resources to another vehicle (S903$a$). In the centralized transmission scheme, resources of another carrier may be also scheduled. In distributed scheduling corresponding to transmission mode 4 illustrated in FIG. 9($b$), a vehicle selects transmission resources (S902$b$), while sensing resources preconfigured by the eNB, that is, a resource pool (S901$b$), and then transmits a signal in the selected resources to another vehicle (S903$b$). When the transmission resources are selected, transmission resources for a next packet are also reserved, as illustrated in FIG. 10. In V2X, each medium access control (MAC) protocol data unit (PDU) is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12($a$) or may be contiguous to each other as illustrated in FIG. 12($b$). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
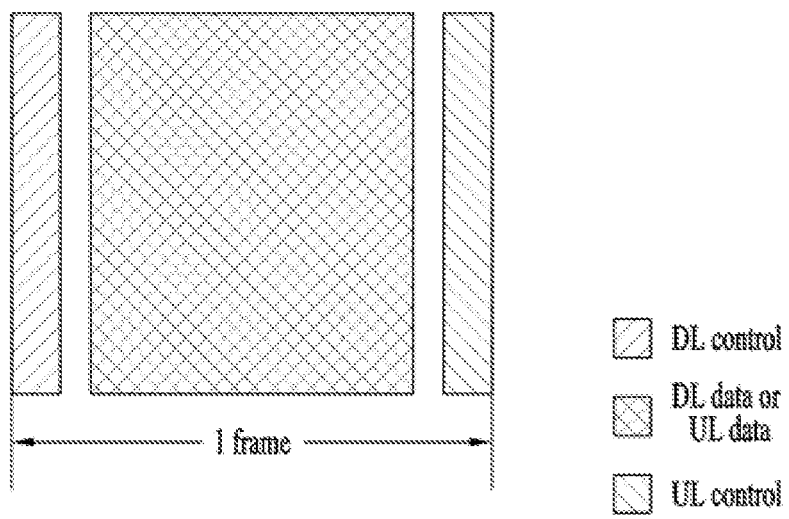
FIGS. 13 and 14 are views illustrating a new radio access technology (NRAT) frame structure
Figure 14:
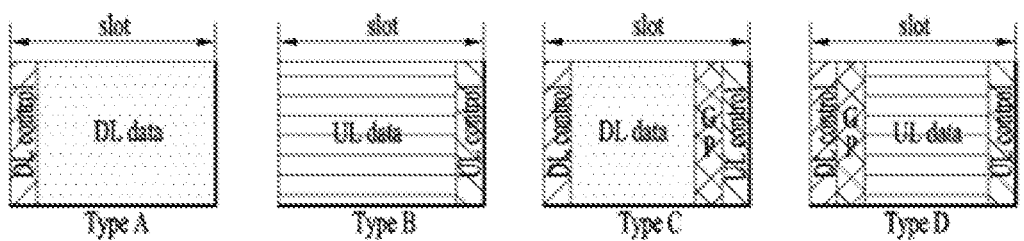

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI, (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

In the following description, a method for controlling transmit power when the transmit power exceeds a power limit (UE antenna output power) in consideration of full/partial simultaneous transmission of a message on a plurality of carriers in sidelink CA transmission (for example, signal transmission on all or some carriers of aggregated CCs in the same subframe) is proposed.

In this case, full/partial simultaneous transmission on carriers means that the UE simultaneously transmits a message on multiple carriers. In this case, the term "simultaneous" means that units (transmit time intervals) in which one transmission occurs completely/partially overlap with each other. In addition, separate transmission between carriers refers to a method by which a UE always transmits data on only one CC in one TTI in transmitting a message on multiple carriers. Transmission of a message on multiple carriers may be a transmission of the same message on all or some carriers, a transmission of different messages, or a combination thereof.

In the following description, a case where a sum of all transmit powers calculated on a plurality of carriers on which transmissions need to be performed in at the same transmission time is greater than an allowed UE antenna output power in full/partial simultaneous transmission on carriers is defined as a case where transmit power exceed the transmit power limit.

Figure 15:
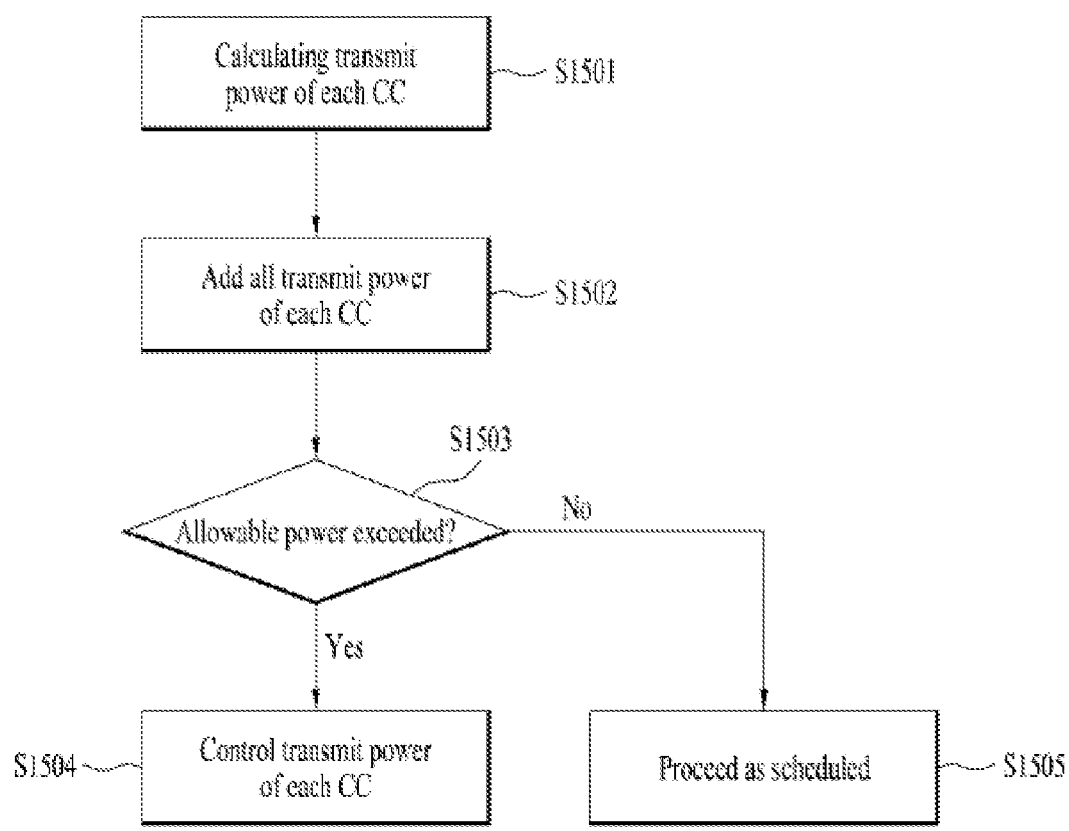
FIG. 15 is a flowchart illustrating controlling of transmit power of a terminal according to an embodiment of the present disclosure.

FIG. 15 is a flowchart illustrating controlling of transmit power of a terminal according to an embodiment of the present disclosure. When CA transmission needs to be performed, transmit powers for individual CCs are calculated (S1501), and the sum of the transmit powers of the individual CCs is calculated (S1502). When the sum of the transmit powers is greater than a preset value (e.g., the maximum output power of a UE antenna) (S1503), the transmit powers of the individual CCs are controlled (S1504). When the sum of the transmit powers of the individual CCs is not greater than the preset value, the CA transmission is performed as scheduled (S1505).

In Rel-14 V2X, for single carrier transmission, the maximum transmit power is determined in consideration of channel busy ratio (CBR) and priority level for each channel. Even when CA transmission is assumed, the transmit power levels for the individual carriers may be calculated in per-carrier operation according to the power control technique based on Rel-14.

For simplicity, in the following description, carrier aggregation through two transport carriers (carrier #X and carrier #Y) (2-CC CA) is assumed. However, the proposed technique is applicable to CA transmission through more than two transport carriers in a similar manner.

Example 1

When the transmit power limit of the UE is exceeded, messages of different carriers may be transmitted at different times (separate transmission or partial simultaneous transmission), or a single carrier transmission may be attempted.

Under the assumption of 2-CC CA (carrier #X and carrier #Y) transmission, when the transmit power limit of the UE is exceeded, the UE may select single carrier transmission over carrier #X rather than CA transmission over carrier #X and carrier #Y based on a specific pre-configured/signaled criteria. Here, the specific criteria may be, for example, a channel busy ratio (CBR), and/or a channel occupancy ratio (CR), and/or a prose per-packet priority (PPPP), and/or a latency requirement, and/or a reliability requirement, and/or a use case. In the case of CA transmission through three or more carriers, partial simultaneous transmission rather than full simultaneous transmission through all carriers may be selected by selecting some of carrier #X(s). In this case, the criteria for selecting carrier #X(s) may be the same as the specific criteria described above. The use case described above may be classified according to whether the purpose of the CA is redundant transmission of the same/similar data through an associated carrier, split transmission through a plurality of carriers of a large message, or the like.

In addition, when the transmit power limit of the UE is exceeded under the assumption of 2-CC CA (carrier #X and carrier #Y) transmission, the event may be regarded as a resource reselection triggering message for carrier #Y and resource reselection for carrier #Y may be performed to attempt separate transmission. In this case, carrier #X may be a specific predefined/network-configured carrier, a carrier of a high carrier priority, a carrier having low congestion (e.g., a carrier having a low traffic load), a carrier having a low CR measurement value, a carrier for transmitting a message of a high priority, or a randomly selected carrier. In the case of CA transmission through three or more carriers, carrier #Y may be a plurality of carriers. That is, considering carrier #Y(s), the proposal may be similarly applied.

Example 2

When the transmit power limit of the UE is exceeded, and a priority value of a message to be transmitted is greater than or equal to a preset/signaled threshold value, transmit powers for individual transport carriers are calculated according to (pre-configured/signaled) transmit power allocation methods for the corresponding carriers.

For example, when a priority of a message transmitted on carrier #X is higher than or equal to a preset threshold under the assumption of 2-CC CA (carrier #X and carrier #Y) transmission, the transmit power may be divided to carrier #X and carrier #Y according to a preset power split ratio. Alternatively, when a packet transmission of a PPPP higher than or equal to a threshold needs to be performed on both carriers #X and #Y, the operation may be performed by equally dividing the power.

In the present example, for convenience of description, a transmit power control operation depending on whether the priority value exceeds a threshold has been described. The present example may be applied in a similar manner depending on whether the message is of a specific predefined/network-configured message type, or whether the message requires a shorter latency (or higher reliability) (rather than a preset/signaled threshold), or whether the message is a message to be transmitted with a longer (or shorter) periodicity (than a preset/signaled threshold).

Example 3

When the transmit power limit of the UE is exceeded, the minimum required (guaranteed) TX power may be set (differently) according to the priority level of a transmitted message and TX power control for each transmission carrier in CA transmission may be performed. Here, the minimum required (guaranteed) TX power may also be referred to as a minimum guaranteed power, and may mean the least power among the transmit powers for transmission on individual carriers (CCs).

The present example may be effective when messages having different priorities for respective carriers are transmitted on all/some carriers. This is because when a message having a low priority is not given a minimum required (guaranteed) TX power, transmission of the message may be excessively delayed.

In addition, it may be a general rule to allow a greater minimum required (guaranteed) TX power for a message having a higher priority, and the minimum required (guaranteed) TX power for each PPPP may be set differently depending on the congestion level. That is, even when the same PPPP is given, the minimum required (guaranteed) TX power may vary depending on conditions such as the state of the channel.

In addition, in this example, a minimum required (guaranteed) TX power for each PPPP may be independently set for different carriers. That is, the minimum required (guaranteed) TX power for each PPPP may not be equally applied to all carriers, and may be set differently depending on characteristics of the carriers (e.g., latency and/or reliability requirements of a transmitted message, or/and channel conditions such as CBR and/or CR, status of transmission of a sync signal).

Further, in this example, the min. guaranteed power may be reinterpreted as a max. allowed power. That is, the maximum allowed transmit power for each PPPP may be limited. Here, the min. guaranteed power may mean the minimum required (guaranteed) TX power, and the max. allowed power may also be referred to as a maximum allowed power and mean the greatest power among the transmit powers for transmission on individual carriers (CCs).

When messages having different PPPPs are transmitted on the respective carriers, a transmit power for a carrier on which a lower PPPP (i.e., higher priority) is transmitted may be allocated first, and only the transmit powers for the carriers on which messages having the remaining high PPPPs (i.e., low priorities) are transmitted may be allocated at the pre-agreed ratio or equally divided as described above. According to the above-described transmit power adjustment scheme, such an operation may be enabled by allowing the max. allowed power for a carrier for transmission of a message having a lower PPPP (higher priority) as the maximum allowed transmit power of the UE.

The proposed schemes described above may be applied not only to simultaneous transmission on (multiple) carriers, but also to single carrier transmission or separate transmission between carriers for the purpose of limiting the maximum allowed power for each PPPP.

The minimum guaranteed power or the maximum allowed power may be set through various methods. For example, it may be preset in the UE, may be indicated through a higher layer, may be indicated through DCI, or may be calculated and set by the UE in transmission.

The proposed schemes described above may be implemented independently, or may be implemented in a combination (or merge) of some proposed schemes. A rule may be defined such that the BS delivers information on whether the proposed methods are applied (or information on rules of the proposed methods) to the UE through a predefined signal (e.g., a physical layer signal or a higher layer signal).

The contents of the present disclosure are not limited to direct communication between UEs, and may be used even on uplink or downlink. In this case, a BS or relay node may use the proposed methods.

It is apparent that examples of the proposed schemes described above may also be included as one of the implementation methods of the present invention, and thus may be regarded as a kind of proposed schemes.

Device Configuration According to Examples of the Present Disclosure

Figure 16:
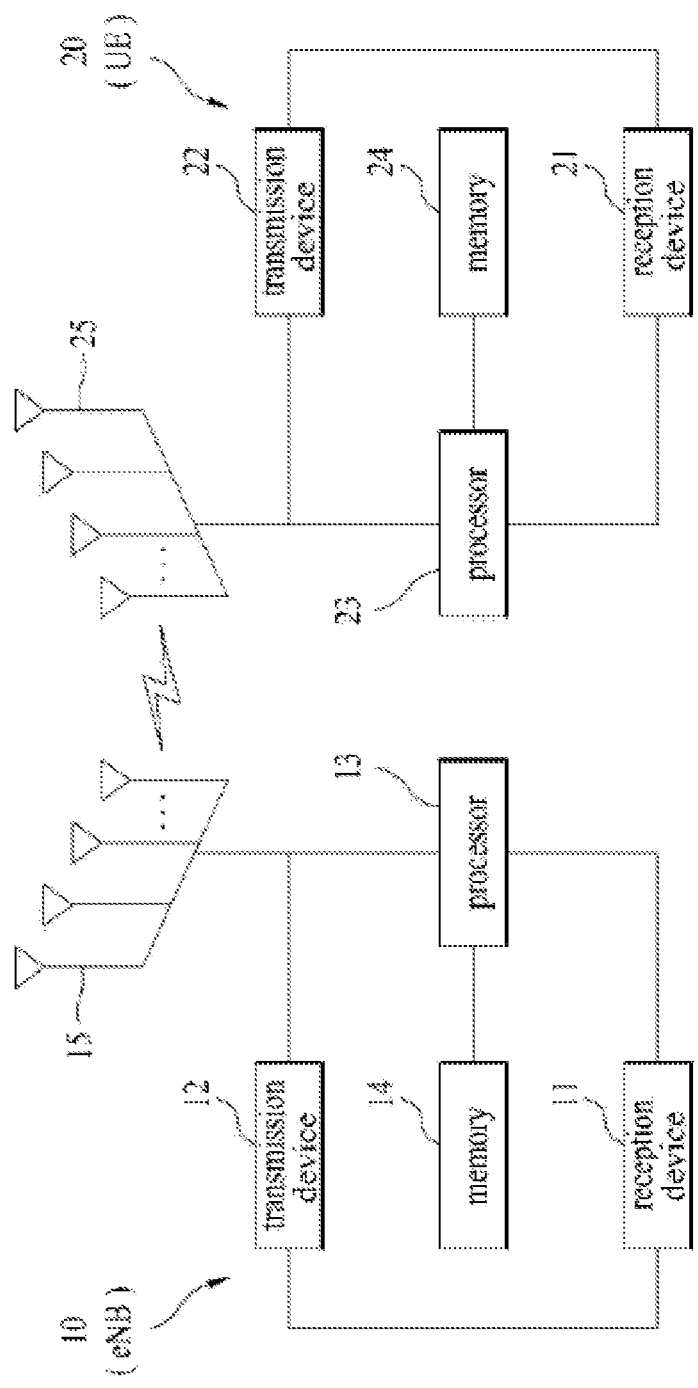
FIG. 16 is a block diagram illustrating a transmitting device and a receiving device.

FIG. 16 is a diagram illustrating configuration of a transmission point apparatus and a UE according to an embodiment of the present disclosure.

Referring to FIG. 16, a transmission point apparatus 10 may include a reception device 11, a transmission device 12, a processor 13, a memory 14, and a plurality of antennas 15. The plurality of antennas 15 represents the transmission point apparatus supporting MIMO transmission/reception. The reception device 11 may receive various kinds of signals, data and information from the UE on the uplink. The transmission device 12 may transmit various kinds of signals, data and information to the UE on the downlink. The processor 13 may control overall operation of the transmission point apparatus 10.

The processor 13 of the transmission point apparatus 10 according to one example may process details necessary in each of the above-described examples.

The processor 13 of the transmission point apparatus 10 may also perform a function of computationally processing information received by the transmission point apparatus 10 and information to be transmitted to the outside, and the memory 14 may store the computationally processed information and the like for a predetermined time, and may be replaced by a component such as a buffer (not shown).

Next, referring to FIG. 16, a UE 20 may include a reception device 21, a transmission device 22, a processor 23, a memory 24, and a plurality of antennas 25. The plurality of antennas 25 represents the UE supporting MIMO transmission/reception. The reception device 21 may receive various kinds of signals, data and information from a base station on the downlink. The transmission device 22 may transmit various kinds of signals, data and information to the base station on the uplink. The processor 23 may control overall operation of the UE 20.

The processor 23 of the UE 20 according to an example of the present disclosure may process details necessary in each of the above-described examples. Specifically, the processor may acquire prose per-packet priorities (PPPPs) of signals transmitted on individual CCs, calculate transmit powers for the signals transmitted on the individual CCs, and set a minimum guaranteed power for the individual CCs when the sum of the transmit powers for the individual CCs exceeds a preset value, wherein the minimum guaranteed power may represent the lowest power among the transmit powers that may be transmitted on the individual CCs, and may be set for each of the PPPPs.

The processor may also acquire PPPPs of signals transmitted on individual CCs, calculate transmit powers for the signals transmitted on the individual CCs, and set a maximum allowed power for the individual CCs when the sum of the transmit powers for the individual CCs exceeds a preset value, wherein the maximum allowed power may represent the highest power among the transmit powers that may be transmitted on the individual CCs, and may be set for each of the PPPPs.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various examples of the present disclosure may be applied independently or such that two or more of the examples are applied at the same time. For clarity, redundant description is omitted.

In the example of FIG. 16, the description of the transmission point apparatus 10 may also be applied to a relay device serving as a downlink transmission entity or an uplink reception entity, and the description of the UE 20 may also be applied to a relay device serving as a downlink reception entity or an uplink transmission entity.

The above-described examples of the present disclosure may be implemented through various means. For example, examples of the present disclosure may be implemented by hardware, firmware, software, or a combination thereof.

In a hardware configuration, the methods according to the examples of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the examples of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred examples of the present disclosure so that those skilled in the art may implement and perform the present disclosure. While reference has been made above to the preferred examples of the present disclosure, those skilled in the art will understand that various modifications and alterations may be made to the present disclosure within the scope of the present disclosure. For example, those skilled in the art may use the components described in the foregoing examples in combination. The above examples are therefore to be construed in all aspects as illustrative and not restrictive.

Those skilled in the art will appreciate that the present disclosure may be carried out in other specific ways than those set forth herein without departing from the spirit and essential characteristics of the present disclosure. The above examples are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an example of the present disclosure or included as a new claim by a subsequent amendment after the application is filed.

The examples of the present disclosure as described above may be applied to various mobile communication systems.

What is claimed is:

1. A method for configuring transmit powers for a plurality of component carriers (CCs) of a terminal in a wireless communication system, the method comprising:
   acquiring prose per-packet priorities (PPPPs) of signals transmitted on the individual CCs;
   calculating transmit powers for the signals transmitted on the individual CCs; and
   setting a minimum guaranteed power for the individual CCs when a sum of the transmit powers for the individual CCs exceeds a preset value,
   wherein the minimum guaranteed power represents a lowest power among the transmit powers transmittable on the individual CCs,
   wherein the minimum guaranteed power is set for each of the PPPPs.

2. The method of claim 1, wherein the minimum guaranteed power has different values for the PPPPs.

3. The method of claim 1, wherein the minimum guaranteed power of a signal with a high PPPP of the PPPPs is greater than the minimum guaranteed power of a signal with a low PPPP of the PPPPs.

4. The method of claim 1, wherein the minimum guaranteed power is set differently for each of the individual CCs based on a state of a channel for transmission of each of the individual CCs.

5. The method of claim 1, wherein the preset value is less than a maximum transmittable power of the terminal.

6. A method for configuring transmit powers for a plurality of component carriers (CCs) of a terminal in a wireless communication system, the method comprising:
   acquiring prose per-packet priorities (PPPPs) of signals transmitted on the individual CCs;
   calculating transmit powers for the signals transmitted on the individual CCs; and
   setting a maximum allowed power for the individual CCs when a sum of the transmit powers of the individual CCs exceeds a preset value,
   wherein the maximum allowed power represents a highest power among the transmit powers transmittable on the individual CC,
   wherein the maximum allowed power is set for each of the PPPPs.

7. The method of claim 6, wherein the maximum allowed power has different values for the PPPPs.

8. The method of claim 6, wherein the maximum allowed power of a signal with a high PPPP of the PPPPs is greater than the maximum allowed power of a signal with a low PPPP of the PPPPs.

9. The method of claim 6, wherein the maximum allowed power is set differently for each of the individual CCs based on a state of a channel for transmission of each of the individual CCs.

10. The method of claim 6, wherein the preset value is less than a maximum transmittable power of the terminal.

11. A user equipment (UE) for configuring transmit powers for a plurality of component carriers (CCs) in a wireless communication system, the UE comprising:
   a transmitter and a receiver; and
   a processor,
   wherein the processor is configured to:
   acquire prose per-packet priorities (PPPPs) of signals transmitted on the individual CCs;
   calculate transmit powers for the signals transmitted on the individual CCs; and
   set a minimum guaranteed power for the individual CCs when a sum of the transmit powers for the individual CCs exceeds a preset value,
   wherein the minimum guaranteed power represents a lowest power among the transmit powers transmittable on the individual CCs,
   wherein the minimum guaranteed power is set for each of the PPPPs.

12. A user equipment (UE) for configuring transmit powers for a plurality of component carriers (CCs) in a wireless communication system, the UE comprising:
   a transmitter and a receiver; and
   a processor,
   wherein the processor is configured to:
   acquire prose per-packet priorities (PPPPs) of signals transmitted on the individual CCs;
   calculate transmit powers for the signals transmitted on the individual CCs; and
   set a maximum allowed power for the individual CCs when a sum of the transmit powers of the individual CCs exceeds a preset value,
   wherein the maximum allowed power represents a highest power among the transmit powers transmittable on the individual CC,
   wherein the maximum allowed power is set for each of the PPPPs.

13. The UE of claim 12, wherein the UE is capable of communicating with at least one of another UE, a UE related to an autonomous driving vehicle, the BS or a network.

* * * * *